Jan. 12, 1954          D. G. HARDMAN          2,665,523
PROTECTIVE HOT CAP FOR PLANTS
Filed April 18, 1950
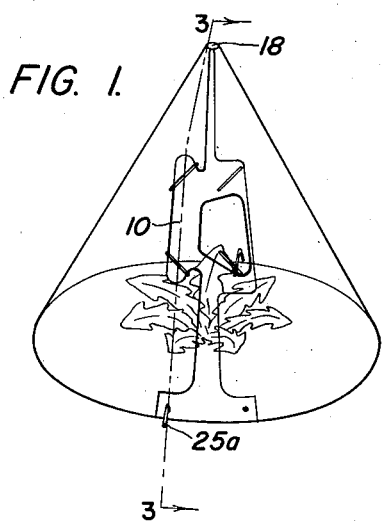
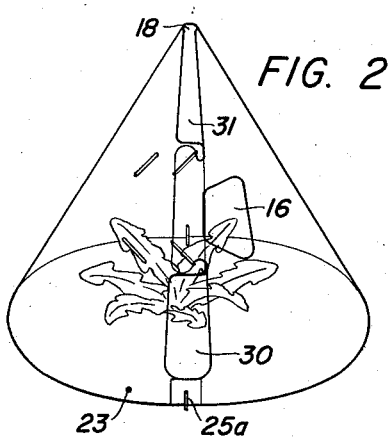
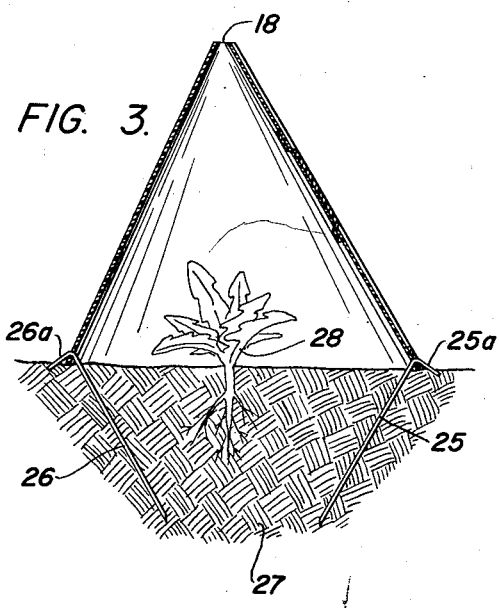
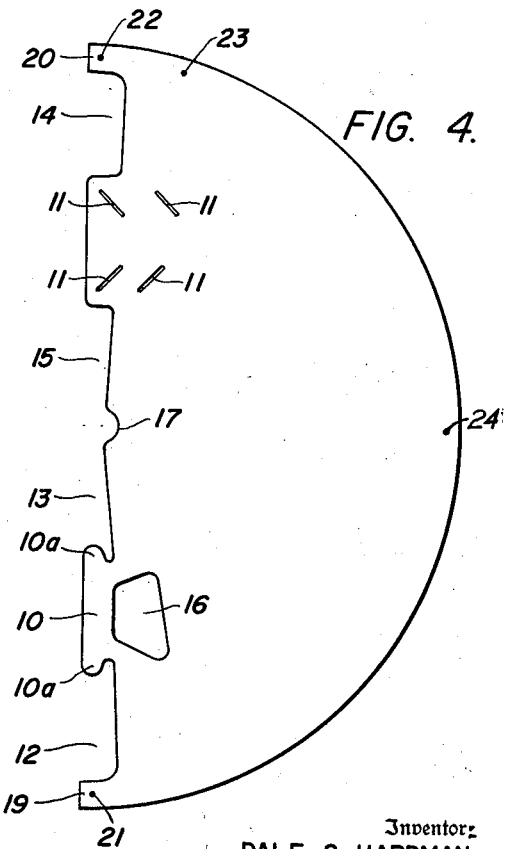
Inventor:
DALE G. HARDMAN,
Attorneys.

Patented Jan. 12, 1954

2,665,523

UNITED STATES PATENT OFFICE 2,665,523

PROTECTIVE HOT CAP FOR PLANTS

Dale G. Hardman, Provo, Utah

Application April 18, 1950, Serial No. 156,591

7 Claims. (Cl. 47—28)

This invention relates to protective covers for plants, and particularly to so-called hot caps for young and delicate plants which are customarily set out of doors directly from seed flats early in the growing season.

Transparent or translucent protective covers for individual plants set out in a garden area early in the growing season are commonly employed by horticulturists, these being either in the form of inverted glass jars or of hoods of paper or other suitable material.

Such protective covers or hot caps have as a general rule either been entirely closed to the atmosphere when set in place over a plant, or have been provided with an aperture communicating with the atmosphere to facilitate normal plant growth. Neither of these conditions is desirable at all times, however, for often it is necessary to completely enclose the plant part of the time, say at night or during stormy weather, while it is unnecessary and in fact a disadvantage to give more than partial protection during the daytime or during good weather. Heretofore, either the rigidity of construction of such hot caps or the manner of anchoring them to the soil has prevented the attainment of desirable adjustments in the degree of protection afforded.

A principal object of the present invention, therefore, is to provide a protective cover or hot cap for plants which may be quickly and easily adjusted from a completely closed condition to a partially open condition, or vice versa, following initial installation over the plant.

Other objects are:

To provide the above having a positive and secure anchorage to the soil, so as to satisfactorily withstand all normal weather conditions encountered during the early planting season.

To provide the above by a construction enabling the use of sheet plastic material, either transparent or translucent as may be desired in any particular instance, and capable of rapid production at low cost.

To provide a protective cover or hot cap which, when partially open, affords superior ventilating characteristics.

In accomplishing these objects, I form a prepared blank of the particular sheet material selected, which blank may be shipped in flat condition to the location of use and there set-up for application to the plants. The blank is substantially semi-circular in configuration, so as to form a cone when set-up, and has its diametrical margin cut to provide mating formations for locking interengagement in the retention of the conical form of the set-up cap. Alternative mating formations are provided to permit selection of either a completely closed set-up position or one which is partially open. A very advantageous partially open condition of such latter position is established by means of vent forming means provided in the diametrical margin of the blank in correlated placement with respect to the mating formations.

Anchorage of the set-up cap and added fastening of same in its set-up condition for better withstanding of inclement weather, is provided by means of stakes passing through openings provided in the arcuate margin of the blank.

Additional objects and features of the invention will become apparent from the following detailed description of the preferred specific embodiment selected for illustration in the accompanying drawing to exemplify the inventive concepts set forth in the claims hereof.

In the drawing:

Fig. 1 represents a perspective view of the hot cap set up and anchored in substantially completely closed condition over a young plant, the view being directed toward the adjustably fastened margins of the sheet blank making up the hot cap;

Fig. 2, a view corresponding to that of Fig. 1, but illustrating the hot cap in a partially open condition;

Fig. 3, a vertical section taken on the line 3—3 of Fig. 1; and

Fig. 4, a plan view of the prepared blank of sheet material employed to form the hot cap of the foregoing figures.

Referring to the drawing: in the semicircular sheet blank condition of Fig. 4, the particular preferred form of the invention here illustrated comprises a fastening tongue 10 and two sets of insert slots 11, the latter being arranged to receive, in mating engagement therewith, tabs 10a which extend from opposite ends of tongue 10.

The tongue 10 is disposed intermediate the length of one half, or radius portion, of the diametrical margin of the blank, while the sets of insert slots 11 are disposed intermediate the length of the other half, or radius portion, thereof. Advantageously, both of such mating formations or members are disposed centrally of the lengths of the respective half diametrical, i. e. opposite radial, margins of the blank, as shown. One set of the insert slots 11 is placed directly behind the other set and along the circumferential extension of the blank by a distance correlated with the depths of aperture-forming indentations also provided in the diametrical margin of the blank.

At opposite sides of the tongue 10 the diametrical margin of the blank is cut away to provide lower and upper indentations 12 and 13, respectively, such indentations being formed coincidentally with the formation of tongue 10. At opposite sides of the first set of insert slots 11, the diametrical margin of the blank is cut out to form lower and upper indentations 14 and 15, respectively, which are substantially coextensive in length and depth with the respective indentations 12 and 13.

Directly back of tongue 10 there is cut out from the body of the blank an aperture 16, which extends inwardly of the blank a distance preferably no greater than the extension of the second set of locking slots 11 inwardly of the blank. Such aperture and the respective indentations aforementioned provide vent openings in the side of the hot cap when the blank is set up in partially open condition.

The upper indentations 13 and 15 preferably merge, and a further indentation 17 of preferably semicircular formation is advantageously provided centrally thereof, whereby a small apex vent 18, Figs. 1, 2 and 3, is provided, whether the hot cap be in its completely closed or its partially open condition.

Cutting of the diametrical margin of the blank to provide the lower indentations 12 and 14 leaves tabs 19 and 20 at opposite ends of such diametrical margin. These tabs are each provided with a small hole, indicated 21 and 22, respectively, for the reception of an anchor stake. Adjacent the tab 20 but spaced apart from the hole 22 thereof, is a similar hole 23 for use as an alternative to the hole 22 when the blank is set-up in the closed position of Fig. 1. As many additional holes of similar nature may be provided around the circumferential margin of the blank as may be desired. However, the one additional hole 24, disposed substantially midway of the length of such circumferential margin, is usually sufficient.

In the setting up of the blank of Fig. 4 to either the closed condition of Fig. 1 or the partially open condition of Fig. 2, the blank is manipulated into essentially conical formation.

For the closed position of Fig. 1, the tabs 10a of tongue 10 are slipped into the second set of slots 11, and an anchor stake 25 is inserted through the registering holes 21 and 22 of the overlapped tabs 19 and 20. It should be noted that the entire extent of the conical walls of the so formed hot cap is completely closed, and that only the small vent opening 18 at the apex is open. The blank is retained in such conical formation by the locking interengagement of the tongue 10 and the second set of slots 11, as well as by the stake 25. An additional stake 26 is passed through the hole 24 for symmetrically anchoring the conically formed hot cap to the soil, see 27, Fig. 3, in protectively covering a plant 28 growing therein. The anchoring stakes, it should be noted, are preferably made of rigid wire whose upper end is turned at right angles, as at 25a and 26a, respectively, for ease of insertion and withdrawal and to provide an effective holding action on the material of the hot cap.

For the partially open condition of Fig. 2, the tabs 10a of tongue 10 are slipped into the first set of slots 11, which brings the anchorage holes 21 and 22 into registry. The anchor stake 25 is then passed through such registering holes 21 and 22.

In this partially open position of the hot cap, a lower aperture 30 is formed by the correlated lower indentations 12 and 14, and an upper aperture 31, being in effect a downward elongation of the apex opening 18, is formed by the correlated upper indentations 13 and 15. It should be noted that aperture 16 is left uncovered, thereby providing a third vent in the side wall of the conically formed hot cap.

It will be observed that change from the closed to the partially open positions, or vice versa, of the hot cap may be easily accomplished by merely removing the stake 25, freeing the tongue 10, and slipping the tabs 10a of the tongue back into the proper set of receiving slots 11.

The vent openings are established by the fact that the area of overlap of the two opposite halves of the diametrical margin of the blank is, in the partially open condition of the hot cap, insufficient to cover the vent-forming indentations 12 and 14 and 13 and 15, respectively, and the aperture 16. On the other hand, in the closed position of the hot cap, the area of overlap of such halves of the diametrical margin of the blank is sufficient to cover such indentations and such aperture. In this connection, it should be noted that the first set of insert slots 11 is located proximate the free edge of the diametrical margin of the blank, and that the second set is spaced inwardly of the blank from the first set by a distance substantially equal to the depths of the vent-forming indentations. Furthermore, the spacing of anchoring hole 23 from anchoring hole 22 is correlated with the mutual spacing of the two sets of insert slots 11.

Whereas this invention is here illustrated and described with respect to a certain preferred embodiment thereof, it should be understood that various changes may be made therein and various other constructions may be adopted on the basis of the teachings hereof, by those skilled in the art, without departing from the protective scope of those of the following claims which are generic to the broader inventive concepts disclosed.

I claim:

1. A protective hot cap installation for plants, comprising a substantially semi-circular blank of sheet material having respective coacting fastening members and respective coacting indentations defined in opposite radial portions of its diametrical margin, said fastening members including alternative components extending deeper into the body of the blank along the circumfertial extension thereof than said indentations, to provide for alternative closed and partially open positions of said hot caps, wherein said indentations are covered in one set-up and fastened position of the blank, but coact to form air vents in another set-up and fastened condition of the blank, said fastening members being interengaged in one of said alternative positions; and means anchoring said hot cap to the ground.

2. The combination recited in claim 1, wherein an aperture is provided inwardly of the blank, adjacent said diametrical margin thereof and within the area of overlap established when the blank is in the said closed set-up and fastened condition of the blank.

3. A protective hot cap for plants, comprising a substantially semi-circular blank of sheet material having its diametrical margin cut to define a pair of end tabs, a pair of lower vent-forming indentations, a pair of upper vent-forming indentations, and a pair of fastening formations interposed between the said lower and upper vent-forming indentations within respective opposite halves of said diametrical margin, one of said pair of fastening formations being a tongue having insert tabs at opposite ends thereof, and the other of said pair of fastening formations being two sets of insert slots for said tab portions of the tongue, the first of said insert slots lying proximate the free edge of said diametrical margin of the blank, and the second set of insert slots being spaced inwardly of the blank therefrom by a distance substantially commensurate with the depths of said vent-forming indentations.

4. The combination recited in claim 3, wherein a pair of anchoring holes are provided in the respective end tabs of the diametrical margin of the blank in mutually registering positions, and wherein an alternative hole is formed in the circumferential margin of the blank at a location which is spaced apart from the hole of the adjacent end tab by a distance correlated with the spacing of the two sets of insert slots.

5. The combination recited in claim 3, wherein a vent-forming aperture is formed in the body of the blank immediately behind the fastening tongue.

6. A protective hot cap for plants, comprising a substantially semi-circular blank of sheet material having respective coacting fastening members and respective coacting indentations in opposite radial portions of its diametric margin; and interengaging locking members which include alternative components extending deeper into the body of the blank along the circumferential extension thereof than said indentations, to provide for alternative closed and partially open positions of said hot cap, wherein said indentations are covered in one set-up and fastened position of the blank, but coact to form air vents in another set-up and fastened condition of the blank.

7. The combination recited in claim 6, wherein an aperture is provided inwardly of the blank, adjacent said diametrical margin thereof and within the area of overlap established when the blank is in the said closed set-up and fastened condition of the blank.

DALE G. HARDMAN.

References Cited in the file of this patent

UNITED STATES PATENTS

| Number | Name | Date |
|---|---|---|
| 74,879 | Bartlett | Feb. 25, 1868 |
| 196,165 | Pardessus | Oct. 16, 1877 |
| 273,181 | Spitznass | Feb. 27, 1883 |
| 333,810 | Baily | Jan. 5, 1886 |
| 893,704 | Byrne | July 21, 1908 |
| 1,805,571 | Davis | May 19, 1931 |
| 1,886,690 | Janssen | Nov. 8, 1932 |

FOREIGN PATENTS

| Number | Country | Date |
|---|---|---|
| 21,087 | Great Britain | 1909 |
| 23,009 | Great Britain | 1913 |
| 234,732 | Switzerland | Feb. 16, 1945 |
| 482,688 | Germany | Sept. 18, 1929 |